United States Patent
Iyanagi et al.

(10) Patent No.: US 6,460,889 B2
(45) Date of Patent: *Oct. 8, 2002

(54) FRONT PORTION STRUCTURE OF VEHICLE FRAME

(75) Inventors: Yoshitaka Iyanagi; Katsumasa Nagano; Akira Oda; Hiroyuki Nagae; Masafumi Sakamoto, all of Kanagawa (JP)

(73) Assignee: Isuzu Motors Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,475

(22) Filed: Nov. 27, 1998

(65) Prior Publication Data

US 2002/0008375 A1 Jan. 24, 2002

(30) Foreign Application Priority Data

Nov. 30, 1997 (JP) ............................................. 9-344110
Nov. 30, 1997 (JP) ............................................. 9-344111

(51) Int. Cl.⁷ ............................................... B62D 21/00

(52) U.S. Cl. ....................................... 280/784; 280/854

(58) Field of Search ................................ 280/784, 788, 280/781, 785, 790, 795, 854; 180/232

(56) References Cited

U.S. PATENT DOCUMENTS

| | | | | |
|---|---|---|---|---|
| 2,383,029 A | * | 8/1945 | Ulrich | 296/198 |
| 2,384,096 A | * | 9/1945 | Kishline | 280/795 |
| 2,856,226 A | * | 10/1958 | Purdy | 280/795 |
| 3,105,701 A | * | 10/1963 | Schilberg | 280/784 |
| 3,794,342 A | | 2/1974 | Froumajou et al. | 280/106.5 |
| 3,881,742 A | * | 5/1975 | Felzer | 280/784 |
| 4,030,772 A | * | 6/1977 | Jacob et al. | 280/795 |
| 4,781,398 A | * | 11/1988 | Uebelstadt et al. | 280/784 |
| 5,611,568 A | * | 3/1997 | Masuda | 280/784 |

FOREIGN PATENT DOCUMENTS

| | | | | |
|---|---|---|---|---|
| JP | 6-56051 | * | 8/1992 | 280/788 |
| JP | 5-116647 | | 5/1993 | B62D/25/20 |

* cited by examiner

Primary Examiner—Brian L. Johnson
Assistant Examiner—Hau Phan
(74) Attorney, Agent, or Firm—Sughrue Mion, PLLC (57) ABSTRACT

A stopper 1 is fixedly mounted on and projects from an outer surface of that portion of a side frame 7 disposed in the vicinity of a front wheel 14. A reinforcement 2 is mounted on an inner surface of that portion of the side frame 7, on which the stopper 1 is mounted, thereby reinforcing the stopper 1. At the time of a collision of a vehicle, a rear side 17 of an outer periphery of the front wheel 14 strikes against the stopper 1, and also the movement of the stopper 1 is prevented by the reinforcement 2, thereby limiting the movement of the front wheel 14. Therefore, the deformation of the side frame 7 and so on toward the vehicle frame is reduced.

5 Claims, 8 Drawing Sheets

FRONT PORTION STRUCTURE OF VEHICLE FRAME

BACKGROUND OF THE INVENTION

1. Field of the Invention

This invention relates to a structure of a front portion of a side frame disposed in the vicinity of a front wheel of a vehicle, and more particularly to a front portion structure of a vehicle frame or a front portion structure which limits the intrusion of the front wheel into a vehicle body at the time of a collision of the vehicle, thereby securing a passenger space.

2. Related Art

In order to solve a problem that a tire intrudes into a body at the time of a collision of a vehicle to thereby reduce a passenger space, there have heretofore been proposed various solving means. Examples of such solving means in a monocoque-body vehicle are disclosed in Japanese Patent Unexamined Publication Nos. 5-116647 and 5-85414.

"Front Portion Structure of Car Body", disclosed in Japanese Patent Unexamined Publication No. 5-116647, is directed to a front portion structure of a frame which comprises a front side member, a floor frame which is integrally connected to the front side member, and is connected to rockers and a floor frame in a bifurcated manner, and a sub-frame connected to the front side member and the floor frame, and this front portion structure is provided in that a rear one of two connection portions of a suspension arm, which are connected respectively to the front side member and the floor frame, is disposed between that portion of the sub-frame, connected to the front side member, and that portion of the sub-frame connected to the floor frame. With this connection construction of the suspension arm, that portion of the suspension arm, including the rear connection portion, can be much deformed without being projected at the time of a collision of the vehicle, so that a front wheel is displaced laterally inwardly, and therefore the area of contact between a tire and the members on the vehicle body is large, and the amount of absorbing of an impact energy is large, thereby limiting the intrusion of the front wheel into the vehicle body.

In "Front Body Portion Structure of Automobile" disclosed in Japanese Patent Unexamined Publication No. 5-85414, there is provided front wheel-turning means for angularly moving a front wheel right or left at the time of a collision of a vehicle so that a crush stroke between the front wheel and the vehicle body can be increased, thereby limiting the intrusion of the front wheel into the vehicle body. There is also disclosed means in which a slanting surface is formed at that portion of a side sill, against which the front wheel can strike, so as to positively angularly move the front wheel outwardly.

Although the above conventional techniques are effective in limiting the intrusion of the tire into the vehicle body, these are applied to a moncoque-body vehicle as described above, and can not be suitably applied to a recreation vehicle (RV) with a frame. Namely, in the case of the recreation vehicle, it is difficult to provide a large energy-absorbing zone, as obtained in a monocoque-body vehicle, at the front portion. And besides, the structure of that portion of the recreation vehicle, disposed around a front suspension, is rigid, and a condition of deformation thereof is different from that of the monocoque-body vehicle, and it is difficult to apply the above conventional techniques to the recreation vehicle.

In a recreation vehicle, there may be proposed means in which a stopper and so on are provided in a path of movement of a front wheel at the time of a collision so as to mechanically limit the movement of the front wheel. However, a side sill, a torque box, a rocker panel and so on are provided rearwardly of the front wheel, and in some cases, it is not possible to provide the stopper forwardly of these parts so as to limit the movement of the front wheel, and besides if the rigidity of the stopper and the rigidity of that portion around the stopper are inadequate, there is easily encountered a problem that that portion around the stopper is deformed, so that the engagement between the front wheel and the stopper is released, thus failing to limit the movement of the front wheel.

SUMMARY OF THE INVENTION

The present invention has been made under the above circumstances, and an object of the invention is to provide a front portion structure of a vehicle frame or front portion structure which can be applied to a recreation vehicle with a frame, and limits the amount of rearward movement of a front wheel at the time of a collision of a vehicle so as to reduce the amount of intrusion of the front wheel into a vehicle body, thereby securing a passenger space.

The above object has been achieved by a front portion structure of a vehicle frame of the invention which is provided at that portion of a side frame disposed in the vicinity of a front wheel, and limits the movement of the front wheel at the time of a collision of a vehicle, provided in that the front portion structure comprises a stopper mounted on and projecting from an outer surface of the side frame, and a reinforcement fixedly secured to an inner surface of that portion of the side frame on which the stopper is mounted; the stopper has such a configuration, and is disposed at such a position that the stopper can abut against a rear side of an outer periphery of the front wheel at the time of a collision of the vehicle; and the reinforcement has a sufficient rigidity to prevent that portion of the side frame, to which the reinforcement is secured, from being deformed by an impact force.

The above object has been achieved by a front portion structure provided in that the front portion structure is fixedly mounted on and projects from an outer surface of that portion of a side frame disposed in the vicinity of a rear side of an outer periphery of a front wheel supported on the side frame through a suspension arm and so on; and the stopper has such a configuration that the stopper can abut against the rear side of the outer periphery of the front wheel at the time of a collision of a vehicle; and the stopper has a sufficient rigidity to prevent the front wheel from coming into contact with the side frame. More specifically, a cross member and/or a front mount bracket are fixedly mounted on that portion of the side frame disposed in the vicinity of the stopper.

In the conventional techniques, at the time of a collision of a vehicle, the front wheel strikes directly against the side frame to greatly deform the side frame. As a result, the front wheel moves toward the vehicle body, thereby reducing the passenger space. In the front portion structure of the vehicle frame according to the present invention, however, there are provided the stopper and the reinforcement, and with this construction, at the time of a collision of the vehicle, the front wheel strikes against the stopper, and also the stopper is reinforced by the reinforcement, and therefore the movement of the front wheel is positively limited by the stopper, and the side frame and so on are deformed only at those portions thereof disposed forwardly of the stopper, and the movement of the front wheel toward the vehicle body is greatly reduced.

In the conventional techniques, at the time of a collision of a vehicle, the front wheel strikes directly against the side frame to greatly deform the sideframe. As a result, the front wheel moves toward the vehicle body, thereby reducing the passenger space.

However, when the stopper of the present invention is provided at the predetermined portion of the side frame, the rear side of the outer periphery of the front wheel strikes against the stopper at the time of a collision of the vehicle, and besides since the stopper has a high rigidity, the contact of the front wheel with the side frame is prevented. As a result, the amount of intrusion of the front wheel into the vehicle body is reduced. Furthermore, the cross member and the front mount bracket are mounted on that portion of the side frame disposed in the vicinity of the stopper, and with this construction, the rigidity of that portion around the stopper is further enhanced, thereby limiting the movement of the front wheel.

DETAILED DESCRIPTION OF THE PREFERRED EMBODIMENTS

Figure 4:
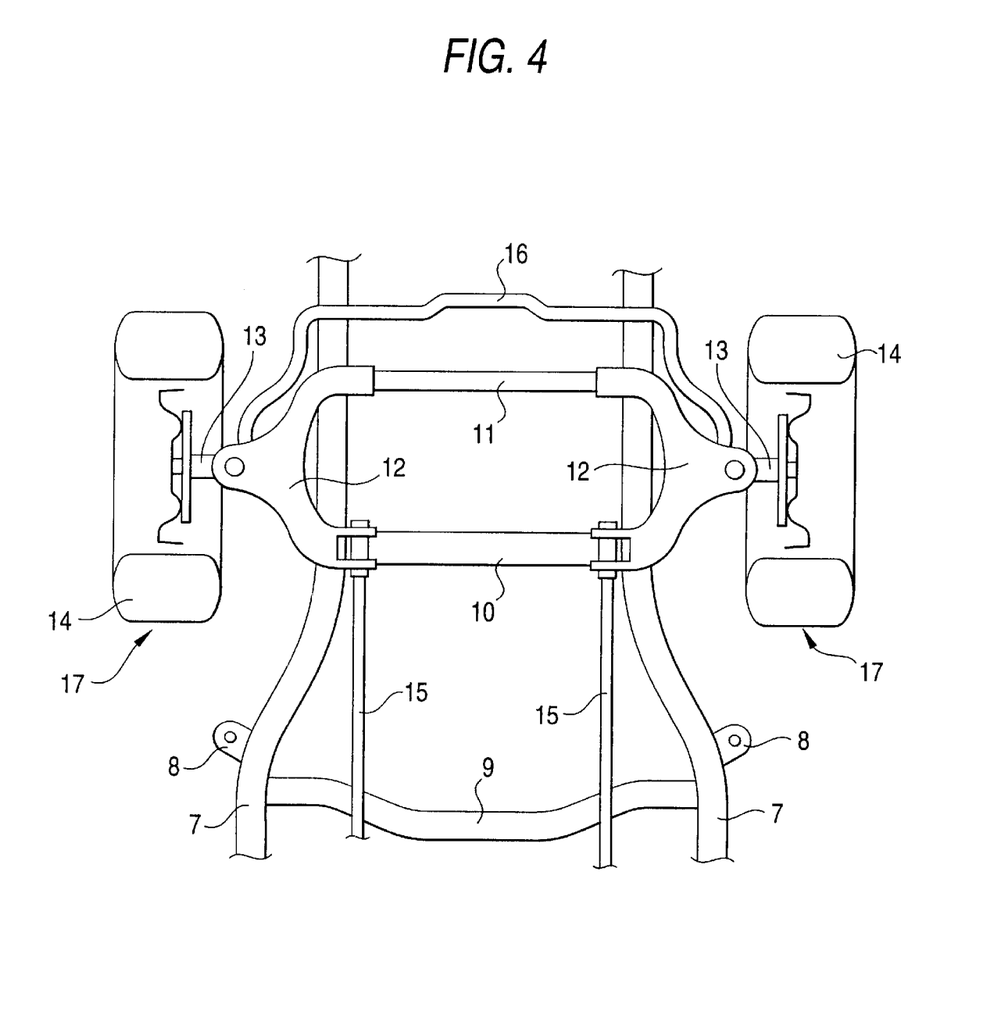
FIG. 4 is a plan view showing a front portion of a conventional frame.
Figure 5:
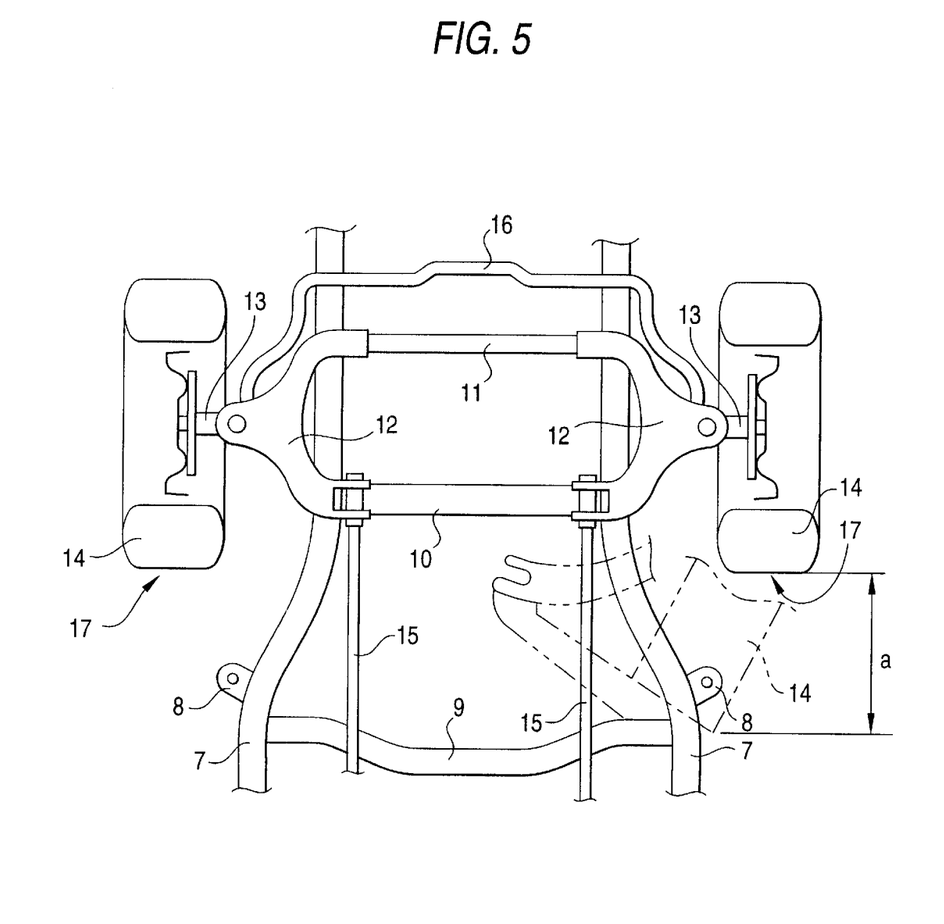
FIG. 5 is a plan view showing the movement of a front wheel and the deformation of a side frame and so on when an impact force is applied to the conventional frame.

FIG. 4 is a view showing a structure, including side frames and neighboring portions thereof, in which the structure of the present invention are not provided, and FIG. 5 shows a condition in which a main portion thereof is deformed at the time of a collision of the vehicle. As shown in FIG. 4, a front wheel 14 is normally spaced considerably from the side frame 7 and a front mount bracket 8. At the time of a collision of the vehicle, the front wheel 14 is forced rearwardly, and is angularly moved in such a direction that a rear side 17 of the outer periphery of the front wheel 14 approaches the side frame 7 as shown in the drawings. Any member for preventing this movement is not provided rearwardly of the front wheel 14, and therefore the front wheel 14 moves rearward a distance (stroke) a until it is brought into engagement with the side frame 7 and the front mount bracket 8, and the front wheel 14 further presses the side frame 7 and so on to deform these portions as shown in the drawings. Therefore, the rear side 17 of the outer periphery of the front wheel 14 intrudes into the inside of the vehicle. As a result, there is encountered a problem that the front wheel 14 and so on intrude into a passenger room to reduce a passenger space.

First Embodiment

Figure 2:
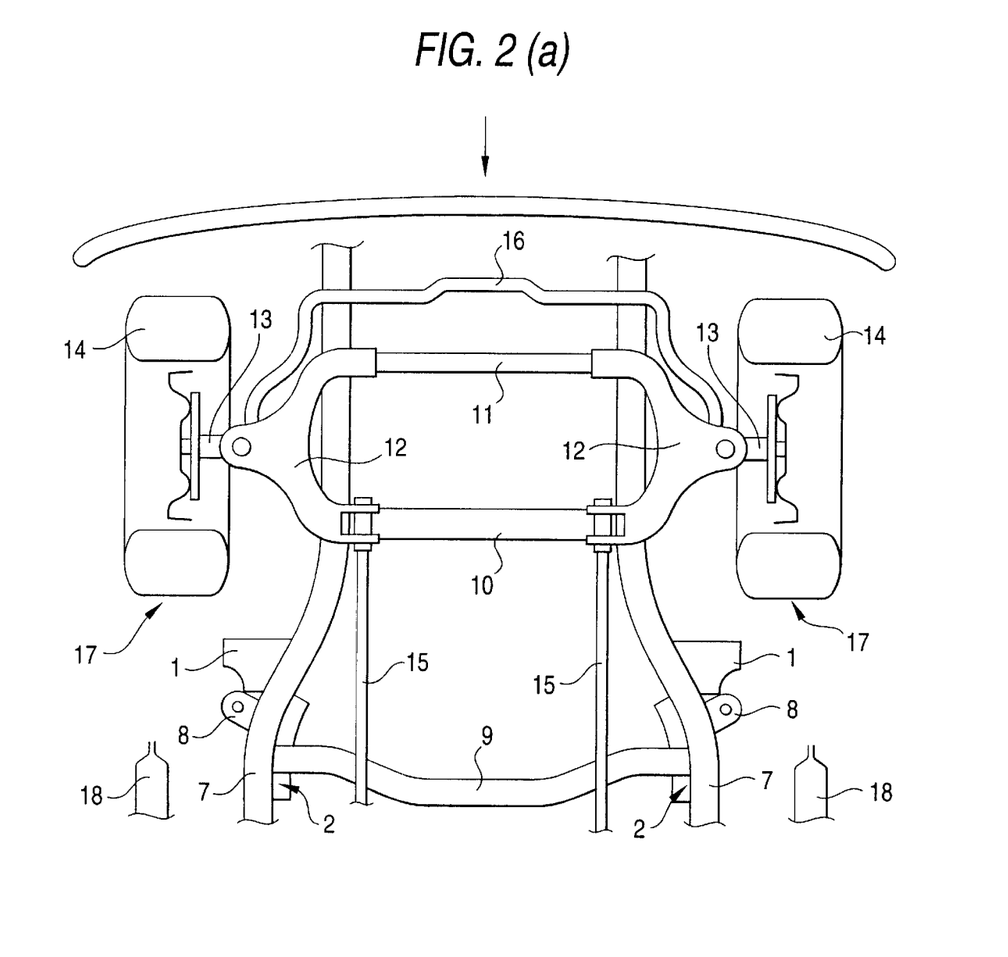
FIG. 2(a) is a plan view showing a front portion structure of the vehicle frame of the first embodiment, including side frames, on which stoppers and reinforcements of the invention are mounted, and front wheels.
FIG. 2(b) is a plan view showing a structure including side frames of the second embodiment of the present invention, on which the stoppers of the invention are mounted, and front wheels.

A front portion structure of a vehicle frame according to a first embodiment of the present invention will now be described in detail with reference to the drawings. First, a structure in the vicinity of that portion of each side frame, on which a stopper of the present invention is fixedly mounted, as well as a front wheel support structure, will be described with reference to FIG. 2. FIG. 2 is a view of a vehicle as seen from its bottom side. Cross members 9, 10 and 11 are mounted on the side frames 7. Front mount brackets 8 are fixedly mounted respectively on outer surfaces of those portions of the side frames 7 on which the cross member 9 is mounted. Proximal end portions of suspension arms 12 are mounted on the cross members 10 and 11. A front wheel 14 is mounted on the suspension arm 12 through a knuckle arm 13 and so on. A torque rod 15 is connected to the suspension arm 12, and a stabilizer 16 is connected to the knuckle arms 13. A side sill 18 is provided rearwardly of the front wheel 14.

Figure 1:
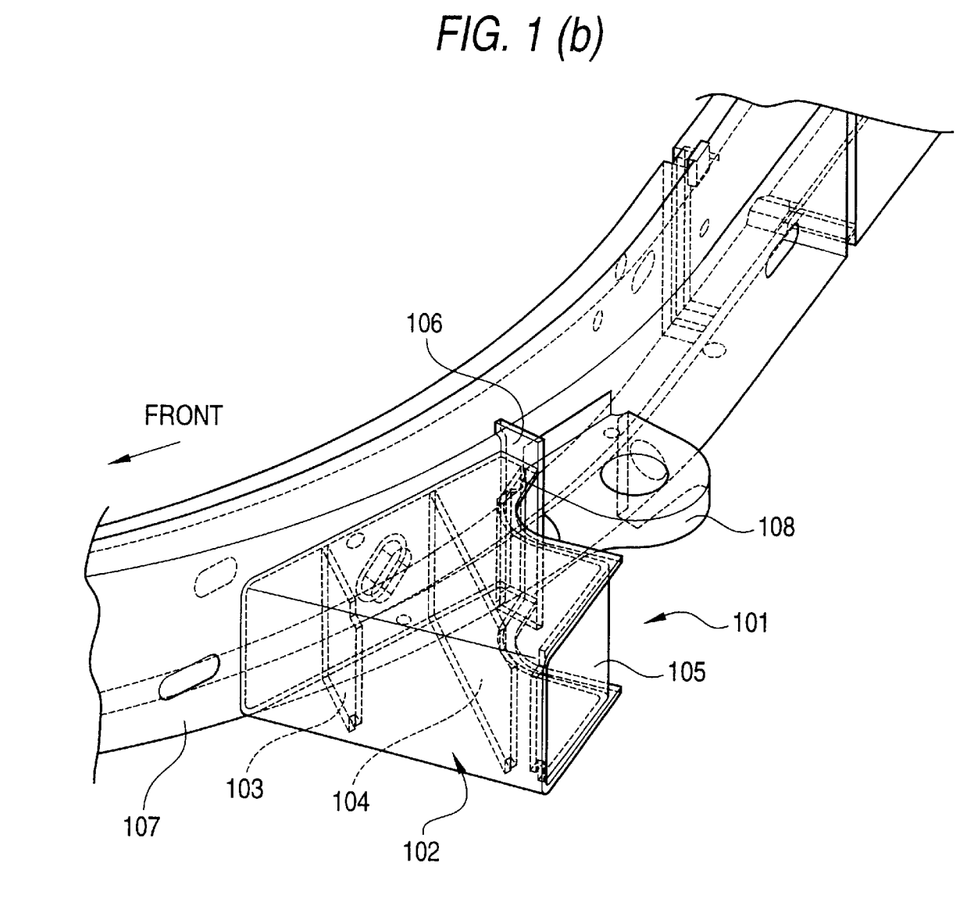
FIG. 1(a) is a perspective view showing a detailed construction of a front portion structure of a vehicle frame of a first embodiment of the present invention.
FIG. 1(b) is a perspective view showing a detailed construction of a front portion structure of a vehicle frame of a second embodiment of the present invention.
Figure 1A:
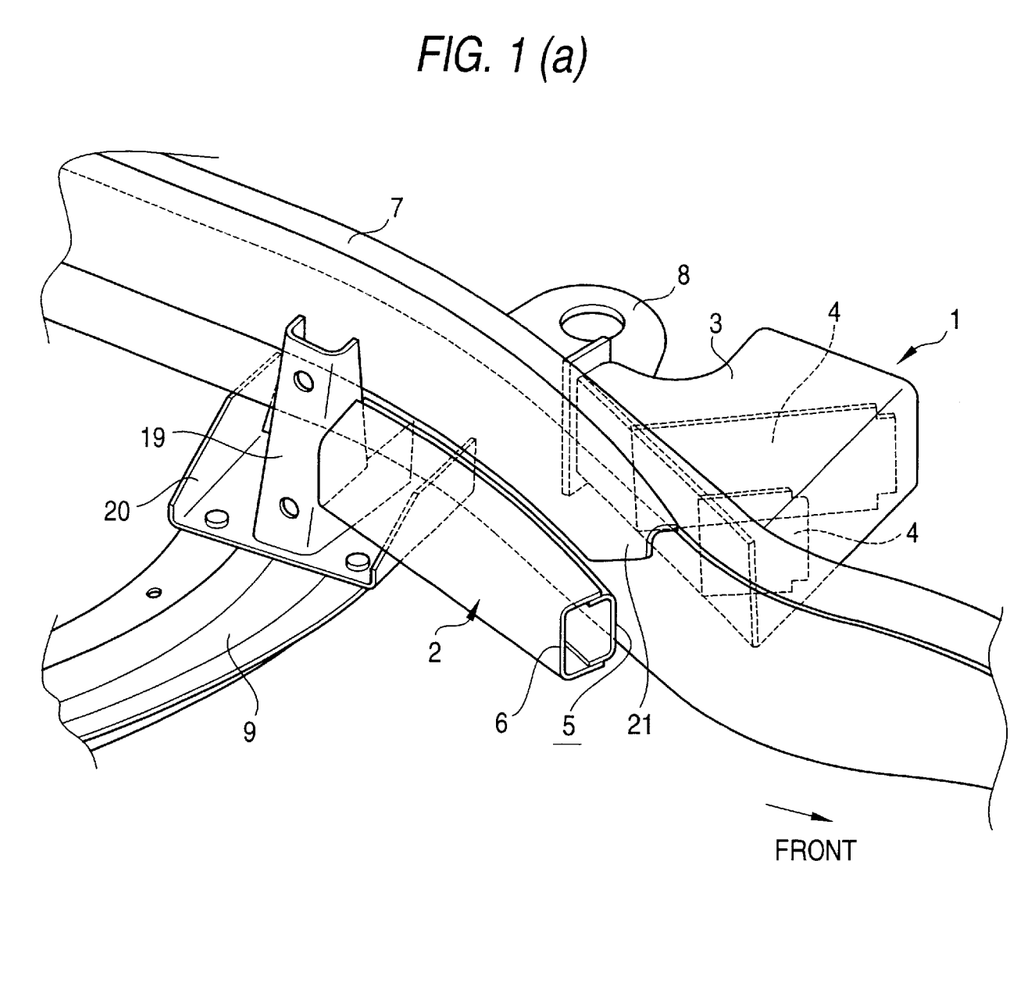

FIG. 1(a) shows the stopper 1, a reinforcement 2 and a reinforcement 21 of the first embodiment of the present invention in detail. As shown in FIGS. 1(a) and 2(a), the stopper 1 is disposed forwardly of the front mount bracket 8 in adjacent relation thereto, and is fixedly secured to and projects from the outer surface of the side frame 7. This position corresponds to a portion against which a rear side 17 of the outer periphery of the front wheel 14 abuts at the time of a collision of the vehicle.

As shown in FIG. 1(a), the stopper 1 comprises a stopper body 3 formed into a generally L-shaped-frame configuration, reinforcing members 4 and other reinforcing members (not shown) fixedly secured to the inside and outside of the stopper body. The stopper body 3 is fixedly secured at its proximal end to the outer surface of the side frame 7 by welding, and projects from this outer surface as described above.

As shown in FIGS. 1(a) and 2(a), the reinforcement 2 and the reinforcement 21 are fixedly secured to the inner surface of that portion of the side frame 7 on which the stopper 1 and the front mount bracket 8 are fixedly mounted. As shown in FIG. 1, the reinforcement 2 comprises an inner member 5 of a U-shaped cross-section fixedly secured to the side frame 7, and an outer member 6 of a U-shaped cross-section fixedly secured to the inner member 5, and the two members jointly form a box-like body of high rigidity. The inner member 5 and the outer member 6 are so configured in the longitudinal direction that the two members can be held in intimate contact with the curved inner surface of the side frame 7. Rear portions of the two members are fixedly secured to a bracket 19 mounted on a bracket 20 which fixes the cross member 9 to the side frame 7.

Figure 3:
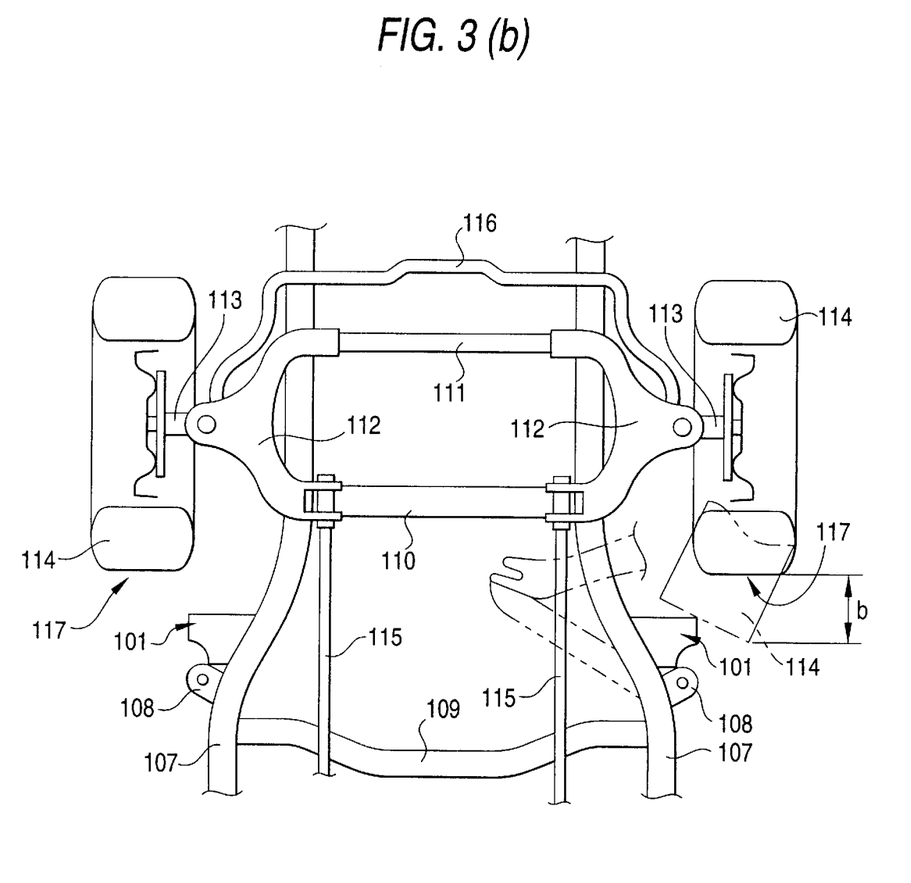
FIG. 3(a) is a plan view showing the movement of the front wheel and the deformation of the side frame and so on when an impact force is applied to the front portion structure of the vehicle frame of the first embodiment of the present invention.
FIG. 3(b) is a plan view showing the movement of the front wheel and the deformation of the side frame and so on when an impact force is applied to the structure of the second embodiment of the the present invention.
Figure 3A:
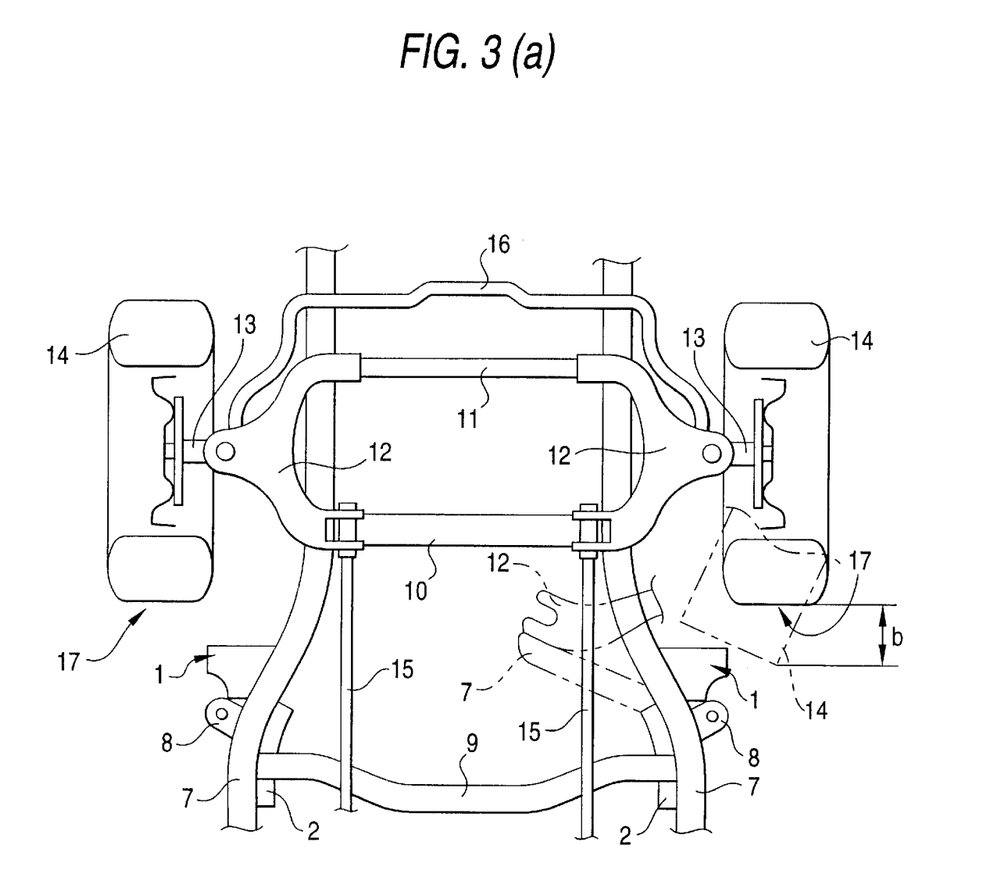

FIG. 3(a) shows changes of the various portions of the front portion structure of the vehicle frame of the invention obtained at the time of a collision of the vehicle. As a result of the collision, the front wheel 14 is moved rearward while angularly moved in such a direction that the rear side 17 of the outer periphery of the front wheel 14 approaches the side frame 7. As a result, the front wheel 14 strikes against the projected end of the stopper 1, and therefore is prevented from further rearward movement. The stopper 1 is reinforced and supported by the reinforcement 2 provided adjacent to the rear side of the stopper 1, and therefore even if a large impact force from the front wheel 14 acts on the stopper 1, the stopper 1 is hardly displaced and changed, so that the stopper 1 is held in its original position. Therefore, the side frame 7 and so on are deformed only at those portions thereof disposed forwardly of the stopper 1 and the reinforcement 2. Therefore, the front wheel 14 moves only a stroke b (<a), and the amount of change of the side frame 7 and so on is much smaller than that in FIG. 4. Therefore, the amount of intrusion of the rear side 17 of the outer periphery of the wheel into the passenger room, as well as the amount of intrusion of the side frame 7 and so on into the passenger room, is greatly reduced.

The reinforcement 2 is reinforced by the cross member 9 and so on, and therefore the total rigidity of that portion around this reinforcement is extremely high, so that the amount of movement of the front wheel 14, the side frame 7 and so on can be reduced as described above.

Second Embodiment

A second embodiment of a front portion structure of the present invention will now be described in detail with reference to the drawings. First, a structure in the vicinity of that portion of each side frame, on which a stopper of the present invention is fixedly mounted, as well as a front wheel support structure, will be described with reference to FIG. 2(b). FIG. 2(b) is a view of a vehicle as seen from its bottom side. Cross members 109, 110 and 111 are mounted on the side frames 107. Front mount brackets 108 are fixedly mounted respectively on outer surfaces of those portions of the side frames 107 on which the cross member 109 is mounted. Proximal end portions of suspension arms 112 are mounted on the cross members 110 and 111. A front wheel 114 is mounted on the suspension arm 112 through a knuckle arm 113 and so on. A torque rod 115 is connected to the suspension arm 112, and a stabilizer 116 is connected to the knuckle arms 113.

FIG. 1(b) shows the detailed construction of the stopper 101 of the present invention. As shown in FIGS. 1(b) and 2(b), the stopper 101 is disposed forwardly of the front mount bracket 108 in adjacent relation thereto, and is fixedly secured to and projects from the outer surface of the side frame 107. This position corresponds to a portion against which a rear side 117 of the outer periphery of the front wheel 114 abuts at the time of a collision of the vehicle.

As shown in FIG. 1(b), the stopper 101 comprises a stopper body 102 formed into a generally L-shaped-frame configuration, reinforcing members 103, 104, 105 and 106 fixedly secured to the inside and outside of the stopper body. The stopper body 102 is fixedly secured at its proximal end to the outer surface of the side frame 107 by welding, and projects from this outer surface as described above. The stopper 101, reinforced by the reinforcing member 103 and the other reinforcing members, has a sufficient rigidity to prevent the front wheel 114 from coming into contact with the outer surface of the side frame 107 even when a large pressing force is applied to the stopper 101 from the front wheel 114 at the time of a collision.

As shown in FIG. 2(b), the stopper 101 is normally spaced an appropriate distance from the front wheel 114, and with respect to the relation between the stopper 101 and the front wheel 114, the stopper 101 is located at a position where the stopper 101 is the closest to the rear side 117 of the outer periphery of the front wheel 114. As described above, the front mount bracket 108 is fixedly mounted in the vicinity of the stopper 101, and that portion of the side frame 107 in the vicinity of the front mount bracket is reinforced by the cross member 109.

FIG. 3(b) shows changes of the structure of FIG. 2(b) obtained at the time of a collision of the vehicle. The front wheel 114 is moved rearward while angularly moved in such a direction that the rear side 117 of the outer periphery of the front wheel 14 approaches the side frame 107. As a result, the rear side 117 of the outer periphery of the front wheel 114 strikes against the projected end of the stopper 101, so that the front wheel 114 is prevented from further rearward movement. The stopper 101 has the high rigidity as described above, and the front wheel 114 moves only a stroke b (<a).

When the front wheel 114 strikes against the stopper 101, the side frame 107, as well as the cross member 110 and the suspension arm 112, which are connected to the side frame 107, is deformed as shown in FIG. 3(b). However, these members are deformed at those portions thereof disposed forwardly of the stopper 101, and the side frame 107 and so on will not be deformed over a range up to the position where the cross member 109 is connected to the side frame 107. Therefore, the amount of intrusion of the side frame 107 and so on into the passenger space in the vehicle is greatly reduced.

As described above, the front mount bracket 108 and the cross member 109 are mounted in the vicinity of the stopper 101, and these members reinforce the stopper 101, and therefore the total rigidity of that portion around the stopper 101 is further enhanced, thereby further reducing the amount of movement of the front wheel 114.

In the front portion structure of the vehicle frame of the present invention, the stopper and the reinforcement, reinforcing the stopper, are mounted on the side frame, and with this construction the movement of the front wheel and the deformation of the side frame are greatly reduced, and the amount of intrusion of the side frame into the vehicle body is reduced, thereby securing the passenger space.

The front portion structure as defined in the present invention limits the movement of the front wheel, and therefore the amount of intrusion of the side frame and so on into the passenger room is reduced, thereby preventing the passenger space from being reduced.

In the front portion structure as defined in the invention, the reinforcing members, such as the front mount bracket and the cross member, are mounted in the vicinity of the stopper, and therefore the total rigidity of that portion around the stopper is enhanced, thereby further reducing the deformation of the side frame and so on.

What is claimed is:

1. A front portion structure of a side frame in a vehicle which has a vehicle body mounted to said side frame, said front portion structure disposed in the vicinity of a front wheel, and limits the movement of the front wheel to said vehicle body at the time of a collision of a vehicle, said front portion structure comprising:

a stopper mounted on and projecting from an outer surface of said side frame and disposed at a predetermined position where said stopper can abut against a rear side of an outer periphery of said front wheel at the time of a collision of the vehicle, and a reinforcement fixedly secured to face said stopper through said side frame and having a sufficient rigidity to prevent a portion of said side frame, to which said reinforcement is secured, from being deformed by an impact force.

2. A front portion structure of a side frame according to claim 1 wherein said reinforcement fixedly secured to face said stopper follows a contour of said side frame.

3. A front portion structure of a side frame according to claim 2, wherein said reinforcement is fixedly secured on said side frame.

4. A front portion structure of a side frame according to claim 1 wherein a surface of said stopper is substantially parallel to said rear side of the outer periphery of said front wheel.

5. A front portion structure of a side frame as claimed in claim 1, wherein said stopper and said reinforcement are mounted on a curved portion of said side frame.

* * * * *